(12) United States Patent
Tanaka

(10) Patent No.: US 11,842,494 B2
(45) Date of Patent: Dec. 12, 2023

(54) APPARATUS, METHOD, AND COMPUTER PROGRAM FOR CORRECTING ROAD REGION

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 17/217,062

(22) Filed: Mar. 30, 2021

(65) Prior Publication Data
US 2021/0312176 A1 Oct. 7, 2021

(30) Foreign Application Priority Data
Apr. 6, 2020 (JP) ................................. 2020-068673

(51) Int. Cl.
*G06K 9/00* (2022.01)
*G06T 7/11* (2017.01)
(Continued)

(52) U.S. Cl.
CPC .............. *G06T 7/11* (2017.01); *G06V 10/267* (2022.01); *G06V 20/182* (2022.01); *G06T 2207/10032* (2013.01); *G06T 2207/30184* (2013.01)

(58) Field of Classification Search
CPC ... G06T 7/11; G06T 2207/10016; G06T 7/74; G06T 2207/30252; G06T 2207/30256;
(Continued)

(56) References Cited

U.S. PATENT DOCUMENTS

2004/0151388 A1 8/2004 Maeda
2007/0014488 A1* 1/2007 Chen ...................... G06V 20/13
382/294
(Continued)

FOREIGN PATENT DOCUMENTS

JP 11283012 A 10/1999
JP 2006-023958 A 1/2006
(Continued)

OTHER PUBLICATIONS

Auclair-Fortier et al., "Survey of Work on Road Extraction in Aerial and Satellite Images," Retrieved from the Internet: URL: https://www.researchgate.net/profile/Marie-Flavie-Auclair-Fortier/publication/2317038_Survey_of_Work_on_Road_Extraction_in_Aerial_and_Satellite_Images/links/0046352404123765b7000000/Survey-of-Work-on-Road-Extraction-in-Aerial-and-Satellite-Images.pdf [retrieved on Aug. 3, 2021] (Dec. 31 2002).
(Continued)

*Primary Examiner* — Alex Kok S Liew
(74) *Attorney, Agent, or Firm* — Dickinson Wright, PLLC

(57) ABSTRACT

An apparatus for correcting a road region includes a processor configured to segment a road region extracted from an aerial image and representing a road into a plurality of partial road regions; associate, for each of the partial road regions, the partial road region with a road section existing at the location of the partial road region, the road section being indicated by map information indicating locations of respective road sections; and correct the road region so as to cover, for each of the partial road regions, the road section corresponding to the partial road region.

6 Claims, 6 Drawing Sheets

(51) Int. Cl.
*G06V 20/10* (2022.01)
*G06V 10/26* (2022.01)

(58) Field of Classification Search
CPC .............. G06T 7/12; G06T 2207/10032; G06T 2207/30184; G06T 11/60; G06T 7/70; G06T 2207/10024; G06T 2207/10036; G06T 7/33; G06T 7/337; G06T 7/37; G06T 7/73; G06T 2207/10028; G06T 2207/20101; G06T 2207/20112; G06T 2207/20161; G06T 2207/30261; G06T 3/0075; G06T 7/75; G06T 11/206; G06T 17/00; G06T 2200/04; G06T 2207/10004; G06T 2207/10012; G06T 2207/10021; G06T 2207/20064; G06T 2207/20081; G06T 2207/20084; G06T 2207/20164; G06T 2207/30108; G06T 2207/30188; G06T 2207/30236; G06T 2207/30241; G06T 2207/30244; G06T 2210/32; G06T 3/00; G06T 3/4084; G06T 5/20; G06T 7/0002; G06T 7/0004; G06T 7/001; G06T 7/0012; G06T 7/13; G06T 7/20; G06T 7/248; G06T 7/251; G06T 7/254; G06T 7/50; G06T 7/564; G06T 7/593; G06T 7/60; G06T 7/85; G06T 7/90

See application file for complete search history.

(56) References Cited

U.S. PATENT DOCUMENTS

| | | |
|---|---|---|
| 2008/0195303 A1 | 8/2008 | Jung et al. |
| 2009/0306881 A1* | 12/2009 | Dolgov ................ G05D 1/0274 701/28 |
| 2010/0040289 A1 | 2/2010 | Irie et al. |

FOREIGN PATENT DOCUMENTS

| | | |
|---|---|---|
| JP | 2007033931 A | 2/2007 |
| JP | 2008509441 A | 3/2008 |
| JP | 2009205403 A | 9/2009 |
| WO | 2018/113787 A1 | 6/2018 |

OTHER PUBLICATIONS

Wang Weixing et al., "A review of road extraction from remote sensing images," Journal of Traffic and Transportation Engineering (English Edition), vol. 3, No. 3, pp. 271-282 (Mar. 17, 2016).

* cited by examiner

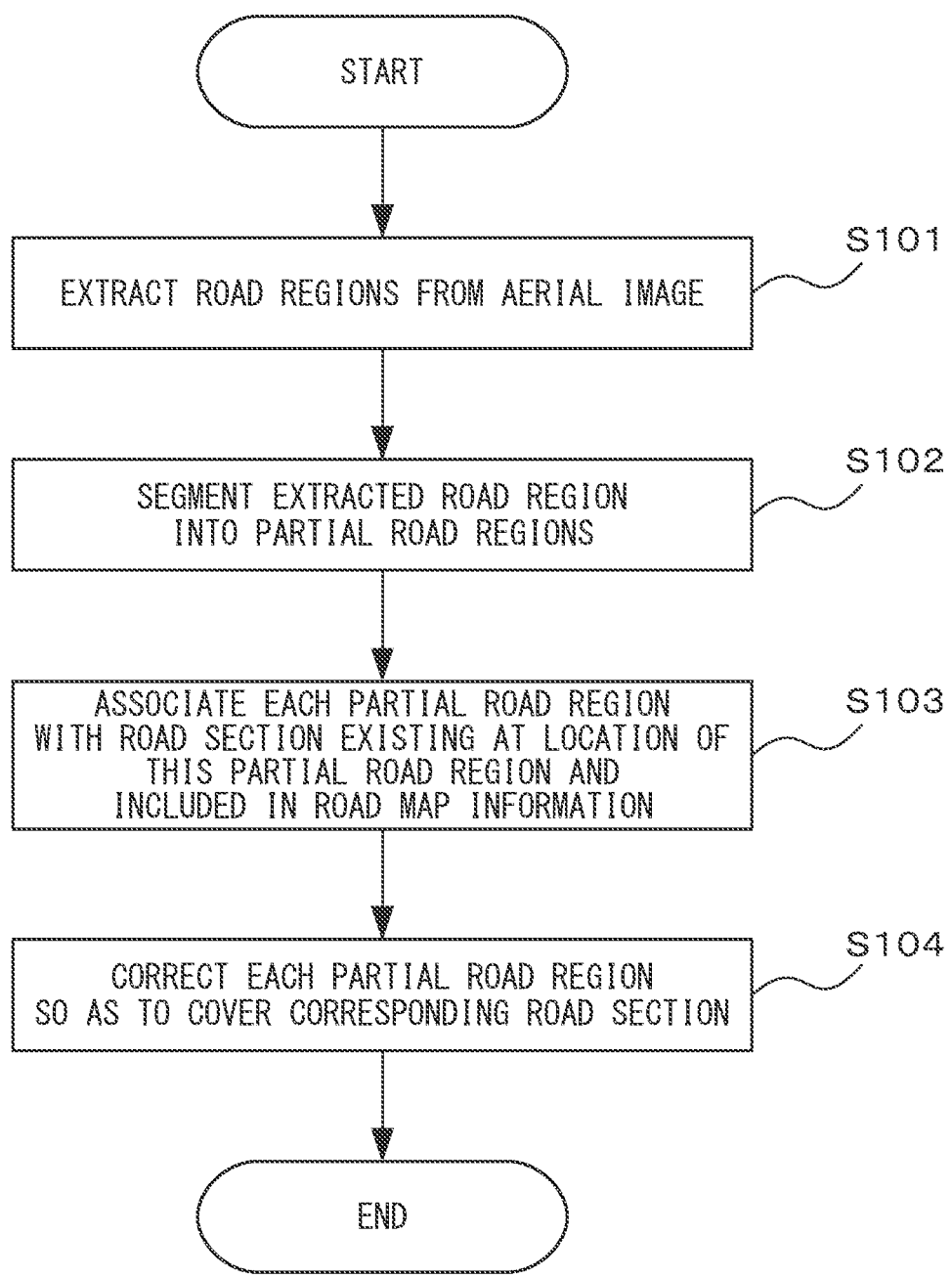

APPARATUS, METHOD, AND COMPUTER PROGRAM FOR CORRECTING ROAD REGION

FIELD

The present invention relates to an apparatus, a method, and a computer program for correcting a road region representing a road on an image.

BACKGROUND

Techniques have been proposed to generate a map from an image representing a satellite or air photograph (e.g., see Japanese Unexamined Patent Publications Nos. 2008-509441, 11-283012, and 2007-33931). For example, Japanese Unexamined Patent Publication No. 2008-509441 discloses a method for displaying map information in which a display of areas representing a top view of a map detail in a two-dimensional or three-dimensional view is at least partially based on an air and/or satellite photograph. Japanese Unexamined Patent Publication No. 11-283012 discloses a technique to recognize a shadow area for generating a map from a remote sensing image. Japanese Unexamined Patent Publication No. 2007-33931 discloses a road recognition system that extracts a part representing a road in an image to generate a road area image, makes markings on parts representing ground objects in the road area image to generate a ground-object extraction image, extracts line components parallel with road vectors in the ground-object extraction image, divides the ground-object extraction image along these line components to generate a road-area division image, and classifies the attributes of respective areas of the road-area division image, based on the sizes and occupancy percentages of ground objects included in these areas.

SUMMARY

Unfortunately, the above techniques do not correctly extract a region representing a road (hereafter, simply referred to as a "road region") on an image in some cases.

It is an object of the present invention to provide an apparatus that can correct road regions extracted from an aerial image so as to correctly cover respective corresponding roads.

As an aspect of the present invention, an apparatus for correcting a road region is provided. The apparatus includes a processor configured to segment a road region extracted from an aerial image and representing a road into a plurality of partial road regions; associate, for each of the partial road regions, the partial road region with a road section existing at the location of the partial road region, the road section being indicated by map information indicating locations of respective road sections; and correct the road region so as to cover, for each of the partial road regions, the road section corresponding to the partial road region.

The processor of the apparatus is further configured to thin or skeletonize the road region to obtain a set of skeletal lines of the road region; divide the set of skeletal lines into individual skeletal lines so that an endpoint or a branching point of skeletal lines included in the set of skeletal lines will be an endpoint of the individual skeletal lines; relate each pixel included in the road region to the closest skeletal line of the divided individual skeletal lines; and determine, for each of the divided individual skeletal lines, a set of pixels related to the skeletal line as one of the partial road regions, thereby segmenting the road region into the plurality of partial road regions.

Alternatively, the processor of the apparatus is further configured to select pixels representing a boundary of the road region as generators to create a Voronoi tessellation from the road region to obtain a set of Voronoi edges of the road region; divide the set of Voronoi edges into individual Voronoi edges so that a Voronoi point or an endpoint included in the set of Voronoi edges will be an endpoint of the individual Voronoi edges; relate each pixel included in the road region to the closest Voronoi edge of the divided individual Voronoi edges; and determine, for each of the divided individual Voronoi edges, a set of pixels related to the Voronoi edge as one of the partial road regions, thereby segmenting the road region into the plurality of partial road regions.

The processor of the apparatus is further configured to acquire information indicating the location and area of a real-space region represented by the aerial image, determine, for each of the partial road regions, a real-space location of the partial road region, based on the position of a reference point of the partial road region in the aerial image and the location and area of the real-space region represented by the aerial image, and determine one of the road sections that is the closest to the real-space location of the partial road region as the road section existing at the location of the partial road region.

The processor of the apparatus preferably corrects the road region so that the road region will include pixels of the aerial image which are not included in the road region and are sandwiched between or encircled by one or more partial road regions associated with the same one of the road sections out of the plurality of partial road regions.

As another aspect of the present invention, a method for correcting a road region is provided. The method includes: segmenting a road region extracted from an aerial image and representing a road into a plurality of partial road regions; associating, for each of the partial road regions, the partial road region with a road section existing at the location of the partial road region, the road section being indicated by map information indicating locations of respective road sections; and correcting the road region so as to cover, for each of the partial road regions, the road section corresponding to the partial road region.

As still another aspect of the present invention, a non-transitory recording medium that stores a computer program for correcting a road region is provided. The computer program includes an instruction causing a computer to execute: segmenting a road region extracted from an aerial image and representing a road into a plurality of partial road regions; associating, for each of the partial road regions, the partial road region with a road section existing at the location of the partial road region, the road section being indicated by map information indicating locations of respective road sections; and correcting the road region so as to cover, for each of the partial road regions, the road section corresponding to the partial road region.

The apparatus according to the present invention has an advantageous effect of being able to correct road regions extracted from an aerial image so as to correctly cover respective corresponding roads.

BRIEF DESCRIPTION OF DRAWINGS

FIG. 6 is an operation flowchart of a road-region correcting process.

DESCRIPTION OF EMBODIMENTS

Hereinafter, an apparatus for correcting a road region, and a method and a computer program therefor used by the apparatus will be described with reference to the accompanying drawings.

It is preferred that "high-precision-map information" used for automated driving control of a vehicle include information on individual roads on a lane-by-lane basis so that a vehicle controller can appropriately perform control concerning lane changing, merging, or passing by referring to the high-precision-map information. One possible way to generate such high-precision-map information is to use an aerial image representing roads, such as an image representing an air or satellite photograph. In such a case, it is desired that road regions extracted from the aerial image correctly cover respective corresponding roads.

In view of the above, the apparatus for correcting a road region segments a road region extracted from an aerial image into partial road regions, and associates, for each of the partial road regions, the partial road region with a road section that exists at the location of the partial road region and is indicated by map information (hereafter, "road map information") indicating the real-space locations of individual road sections. For each of the partial road regions, the apparatus then corrects the road region so as to cover the road section corresponding to the partial road region.

In the embodiments or modified example described below, an aerial image that is a target for a road-region correcting process may be, for example, an image representing a high-resolution satellite or air photograph. The road map information may be, for example, map information used by a navigation device for searching for a route to a destination. However, the road map information is not limited thereto, and may be one indicating the real-space locations of individual road sections. The road map information may also include information indicating the connection relationship between individual road sections.

The following describes an apparatus for correcting a road region according to an embodiment. The apparatus extracts road regions representing roads on an aerial image, and corrects the extracted road regions so as to correctly cover the respective corresponding roads.

Figure 1:
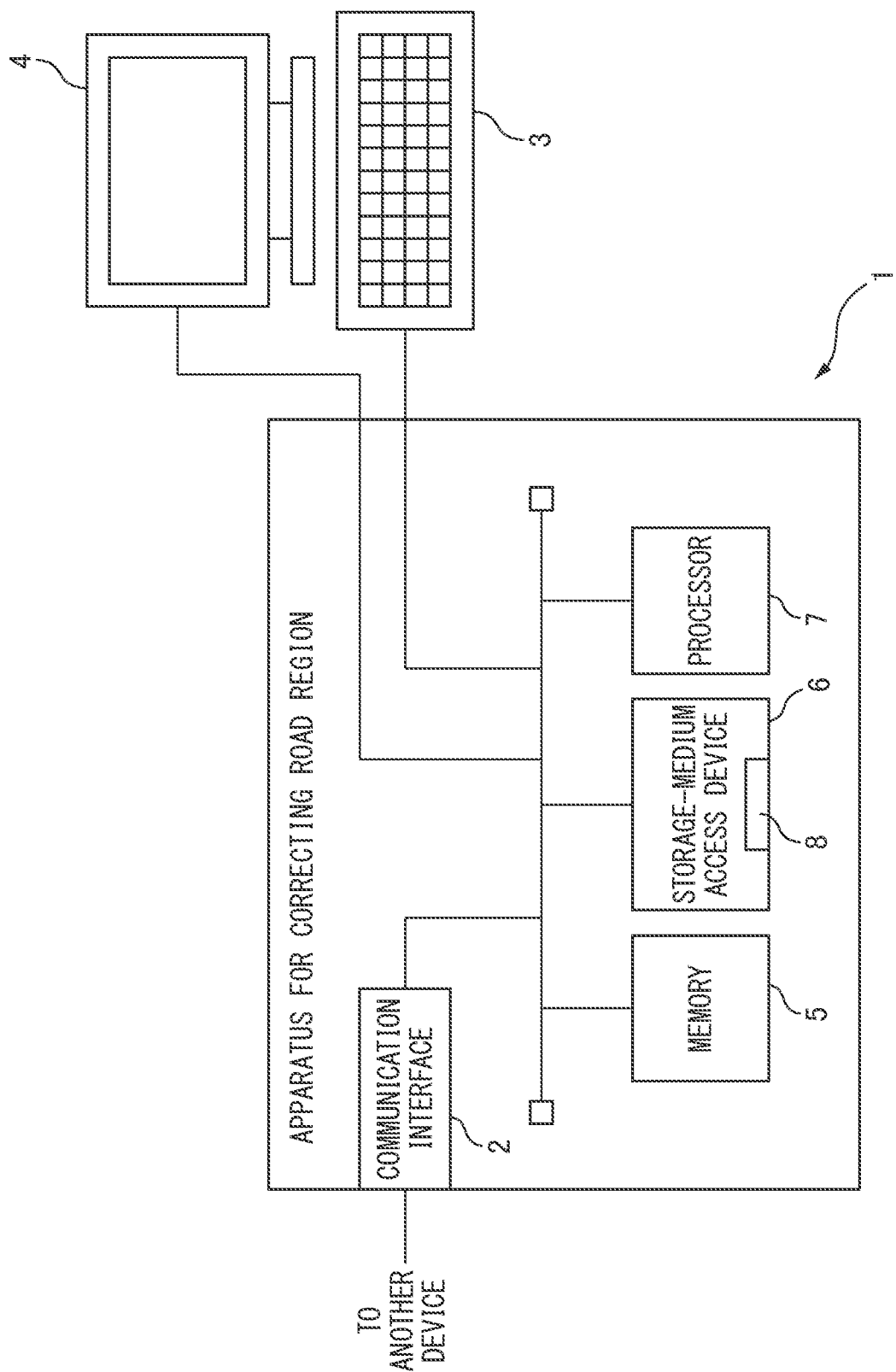
FIG. 1 illustrates the hardware configuration of an apparatus for correcting a road region according to an embodiment.

FIG. 1 illustrates the hardware configuration of the apparatus for correcting a road region. As illustrated in FIG. 1, the apparatus 1 includes a communication interface 2, an input device 3, a display 4, a memory 5, a storage-medium access device 6, and a processor 7.

The communication interface 2 includes a communication interface and a control circuit thereof that are compliant with a communication standard, such as Ethernet (registered trademark), and used for connection to such a communication network. The communication interface 2 receives various types of information or data from another device (not illustrated) connected via the communication network, and passes the received information or data to the processor 7.

The data received by the communication interface 2 may include an aerial image representing roads, which is a target for the road-region correcting process, and information indicating a geographical area represented in the aerial image, such as the latitude and longitude of a predetermined location (e.g., the upper left corner or the center) in a region represented in the aerial image, the real-space sizes of the region measured in the horizontal and vertical directions, and their bearings. The data received by the communication interface 2 may also include the road map information. The communication interface 2 may also output information that is received from the processor 7 and indicates road regions obtained by performing the road-region correcting process, to another device via the communication network. Such information indicating road regions may be simply referred to as "road-region information" below.

The input device 3 includes, for example, a keyboard and a pointing device, such as a mouse. The input device 3 generates an operation signal in response to an operation by a user, such as an operation for selecting an aerial image as a target of the road-region correcting process, for giving instructions to start execution of the road-region correcting process, or for causing generated road-region information to appear on the display 4, and outputs the operation signal to the processor 7.

The display 4 includes, for example, a liquid crystal display or an organic electroluminescent display. The display 4 displays data received from the processor 7, such as data representing candidates for an aerial image that is a target for the road-region correcting process, or generated road-region information or a portion thereof.

The input device 3 and the display 4 may be integrated into a single device like a touch panel display.

The memory 5, which is an example of a storing unit, is composed of, for example, a readable-writable semiconductor memory and a read-only semiconductor memory. The memory 5 stores, for example, a computer program for the road-region correcting process executed by the processor 7; various types of data used in the road-region correcting process, such as an aerial image that is a target for the road-region correcting process, information indicating a geographical area represented in the aerial image, the road map information, and a parameter set that defines a classifier used in the road-region correcting process; and various types of data generated during execution of the road-region correcting process. The memory 5 may also store generated road-region information.

The storage-medium access device 6 is a device that accesses a storage medium 8, such as a magnetic disk, a semiconductor memory card, and an optical storage medium. The storage-medium access device 6 together with the storage medium 8 constitutes another example of the storing device. The storage-medium access device 6 reads data stored in the storage medium 8, such as a computer program for the road-region correcting process to be executed on the processor 7, or an aerial image that is a target for the road-region correcting process and information indicating a geographical area represented in the aerial image, and passes them to the processor 7. Alternatively, the storage-medium access device 6 may receive generated road-region information from the processor 7, and write the road-region information to the storage medium 8.

The processor 7, which is an example of a processing unit, includes, for example, one or more CPUs and peripheral circuits thereof. The processor 7 may also include arithmetic circuits for numerical operations, graphics processing, and logical operations. The processor 7 controls the overall operation of the apparatus 1. The processor 7 performs the road-region correcting process on an aerial image representing roads, which is a target for the road-region correcting process.

Figure 2:
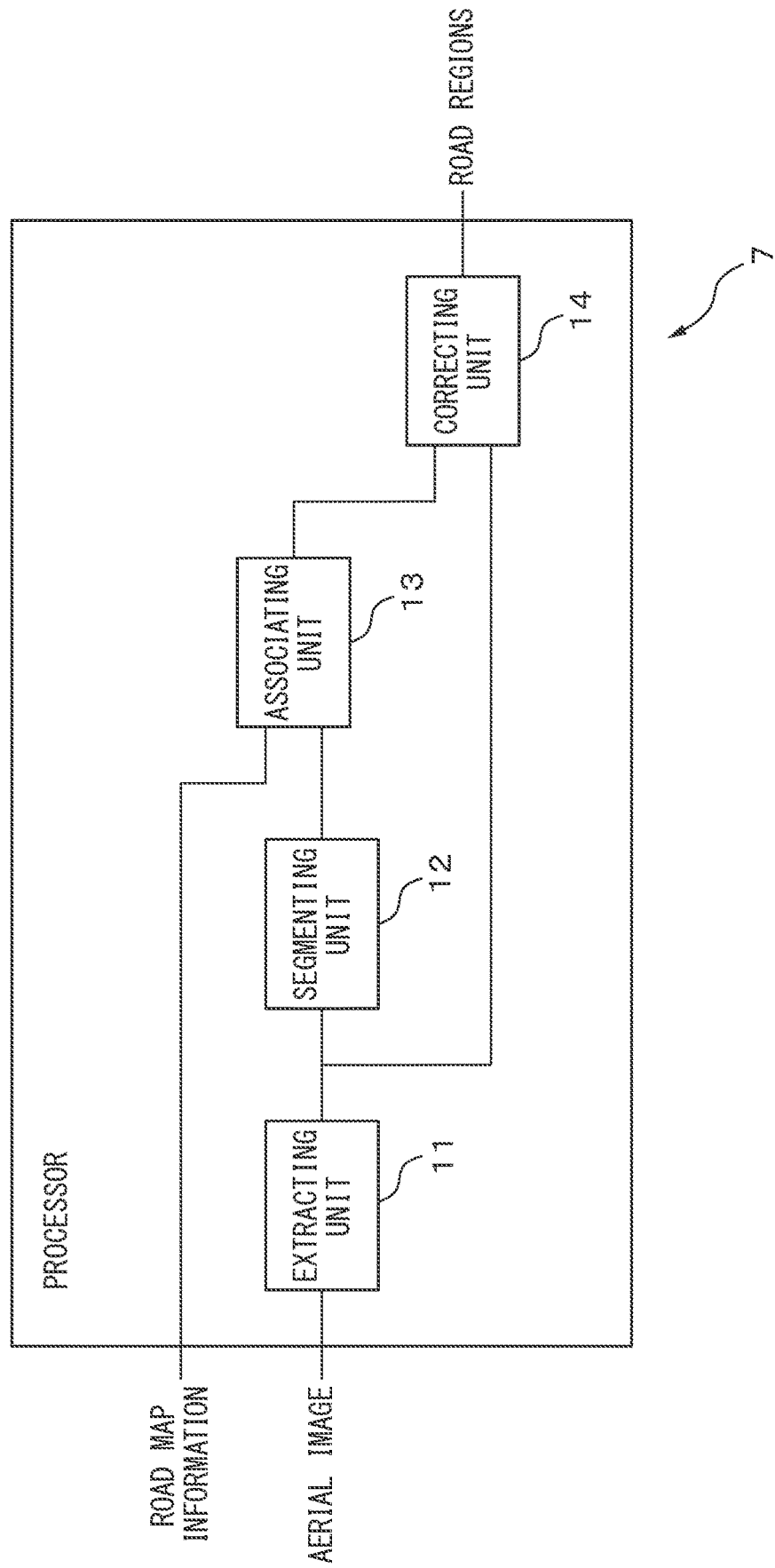
FIG. 2 is a functional block diagram of a processor of the apparatus for correcting a road region.

FIG. 2 is a functional block diagram of the processor 7. As illustrated in FIG. 2, the processor 7 includes an extracting unit 11, a segmenting unit 12, an associating unit 13, and a correcting unit 14. These units included in the processor 7 are, for example, functional modules implemented by a computer program executed on the processor 7, or may be dedicated arithmetic circuits provided in the processor 7.

The extracting unit 11 extracts road regions from a target aerial image. To this end, the extracting unit 11 inputs, for example, a target aerial image into a classifier that has been trained to output, for each pixel of the image, the type of an object represented in the pixel, thereby extracting the road regions.

As the classifier, the extracting unit 11 may use, for example, a "deep neural network" (DNN) having a convolutional neural network (CNN) architecture. More specifically, the extracting unit 11 may use, as the classifier, a CNN for semantic segmentation, e.g., a CNN such as a fully convolutional network (FCN) (Long, J., Shelhamer et al., "Fully convolutional networks for semantic segmentation," In CVPR, 2015), U-Net, SegNet, PSPNet, or RefineNet. Alternatively, the extracting unit 11 may use, as the classifier, a classifier based on another semantic segmentation technique, such as a random forest.

Figure 3:
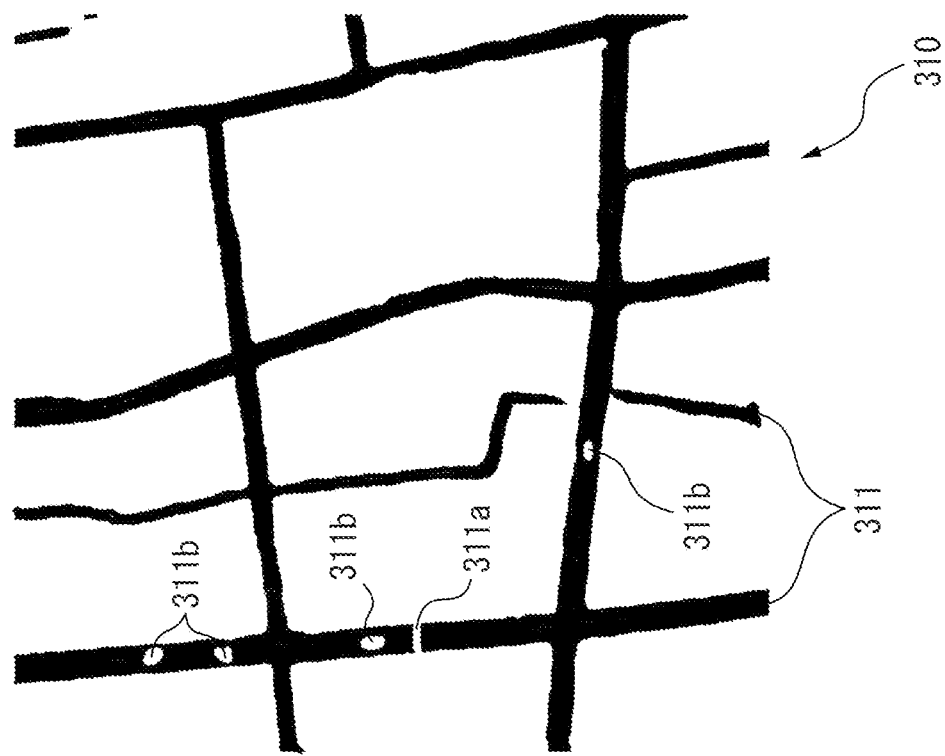
FIG. 3 illustrates an example of an aerial image and extracted road regions.
Figure 3:
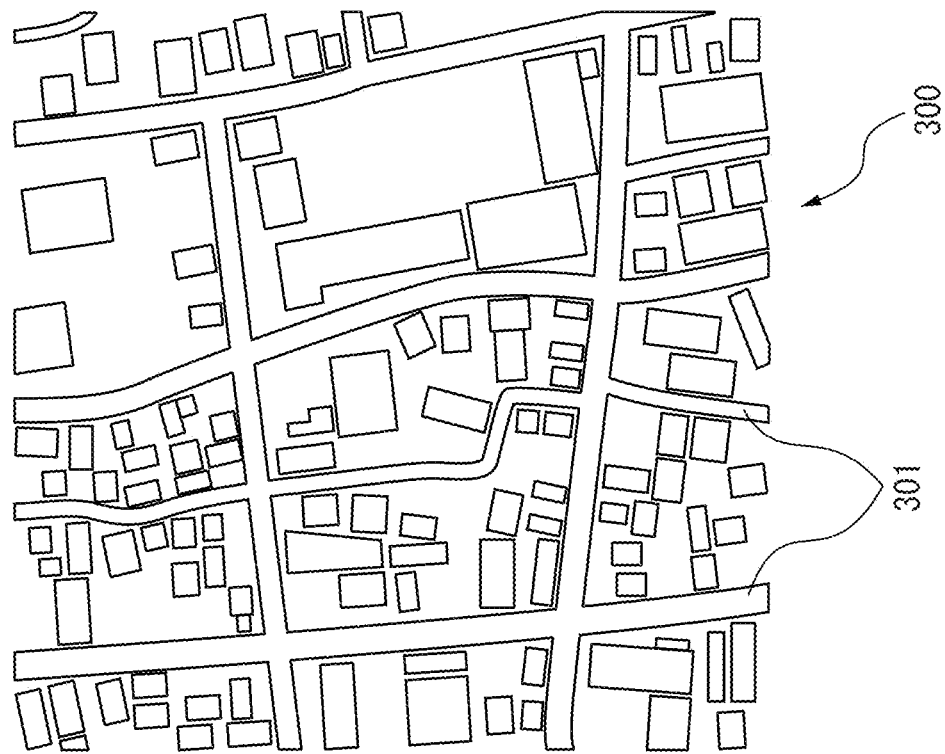

FIG. 3 illustrates an example of an aerial image and extracted road regions. The image 300 in FIG. 3 is an example of an aerial image that is a target for extraction of road regions, whereas the binary image 310 in FIG. 3 represents road regions 311 extracted from the aerial image 300. In this example, the road regions 311 are represented in black. Roads 301 represented in the aerial image 300 include portions that are unrecognizable as roads, because of shadows of buildings cast onto the roads 301 or for other reasons. This prevents correct extraction of road regions. As a result, the road regions 311 include a breaking place 311a although the roads 301 do not have a break. In addition, the road regions 311 include holes 311b although the roads 301 do not have a space between lanes. Such a breaking place 311a and holes 311b may prevent obtaining a correct lane network, which indicates the connection relationship between lanes included in the high-precision-map information, when the high-precision-map information is generated by referring to the road regions 311. For this reason, it is preferred to correct the road regions 311 so as to remove the breaking place 311a and the holes 311b.

The extracting unit 11 passes information indicating the extracted road regions to the segmenting unit 12 and the correcting unit 14. The information indicating the road regions may be, for example, a binary image in which pixels inside the road regions and pixels outside the road regions have different values, the binary image being the same size as the aerial image that is a target for extraction of the road regions.

The segmenting unit 12 segments each road region into partial road regions. In the present embodiment, the segmenting unit 12 segments each road region into partial road regions so that each of the partial road regions will be easily associated with one of the road sections indicated by the road map information, e.g., so that a lengthwise end of the road region or a branching point, such as an intersection, will be one end of a partial road region. To this end, for example, the segmenting unit 12 skeletonizes or thins the road regions to obtain a set of skeletal lines (hereafter, "skeleton net links") that indicate the structure of the road regions and extend with a width of one pixel. The segmenting unit 12 may apply one of various algorithms of skeletonizing or thinning processing to the road regions to obtain the skeleton net links of the road regions.

The segmenting unit 12 divides the skeleton net links of the road region into partial skeletal lines. At this division, the segmenting unit 12 may determine each partial skeletal line so that one end of this partial skeletal line will be a branching point of skeletal lines or an endpoint of a skeletal line included in the skeleton net links. The segmenting unit 12 may further select a location where a skeletal line bends at an angle greater than a predetermined angle as an endpoint of the skeletal line.

The segmenting unit 12 relates each pixel included in the road region to one of the partial skeletal lines that is the closest to the pixel. For each of the partial skeletal lines, the segmenting unit 12 then determines a region that is a set of pixels related to the partial skeletal line as a partial road region. In this way, the segmenting unit 12 can segment each road region into partial road regions so as to facilitate association with one of the road sections indicated by the road map information.

Figure 4:
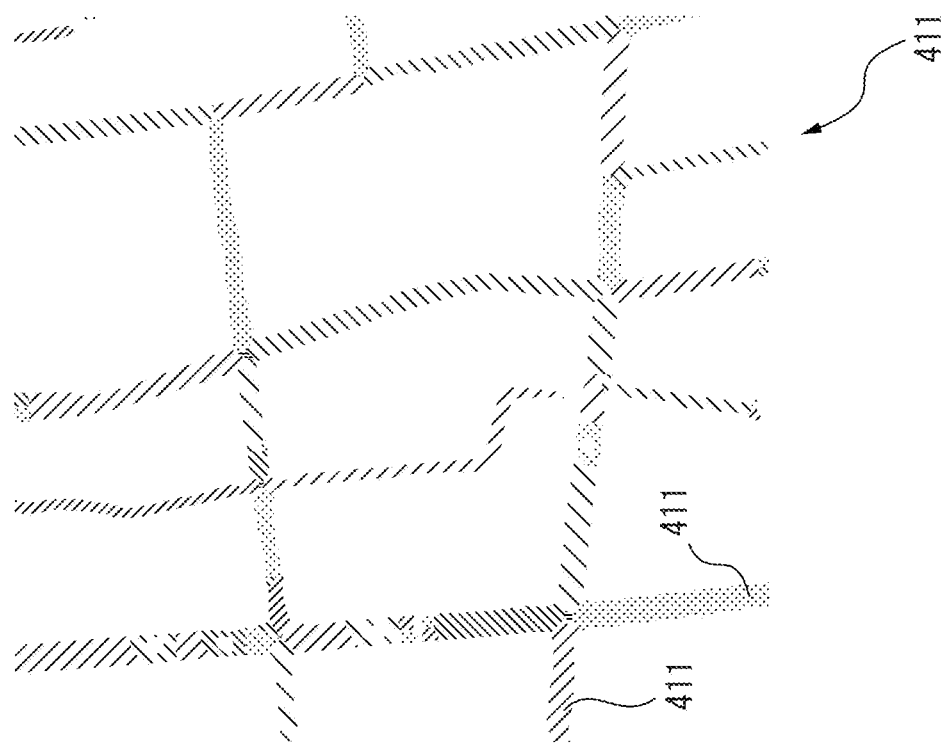
FIG. 4 illustrates an example of partial road regions obtained by dividing each road region.
Figure 4:
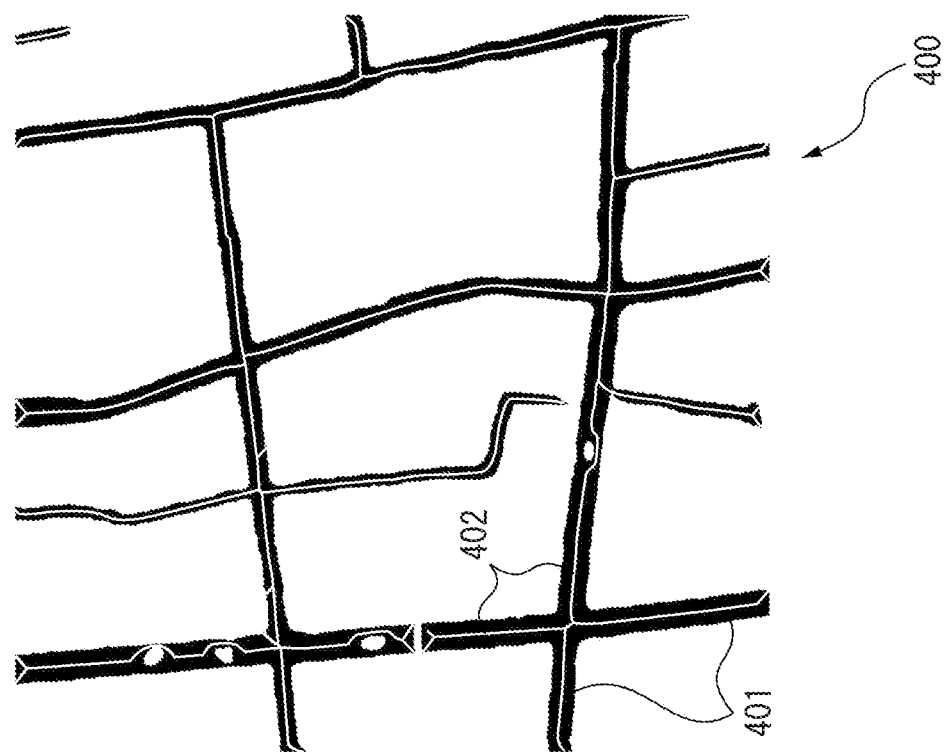

FIG. 4 illustrates an example of the partial road regions obtained by dividing each road region. The binary image 400 on the left in FIG. 4 represents road regions 401 in black. Application of thinning or skeletonizing processing to the road regions 401 produces skeleton net links 402 represented by white lines. As in the image 410 illustrated on the right in FIG. 4, relating each pixel of the road regions 401 to one of the partial skeletal lines included in the skeleton net links 402 produces partial road regions 411.

The segmenting unit 12 passes information indicating the partial road regions to the associating unit 13. The information indicating the partial road regions may be, for example, an image in which, for each of the partial road regions, pixels included in the partial road region and pixels included in the other partial road regions have different values, the image being the same size as the aerial image that is a target for extraction of the road regions.

The associating unit 13 associates, for each of the partial road regions, the partial road region with a road section that exists at the location of the partial road region and is indicated by the road map information. In the present embodiment, the associating unit 13 may perform the same processing on the partial road regions to associate them with road sections. Thus, the following describes processing on a single partial road region of interest.

The associating unit 13 acquires information indicating a geographical area of an original aerial image, which is a target for extraction of the road regions, i.e., information indicating the location and area of a real-space region represented in the aerial image via the communication interface 2 or from the memory 5 or the storage medium 8. The associating unit 13 then determines a real-space location of the partial road region of interest, based on the position of a reference point of the partial road region in the aerial image and the location and area of the real-space region represented by the aerial image. For example, the associating unit 13 selects the centroid of the partial road region of interest or the midpoint of the corresponding skeletal line as the reference point of the partial road region, and determines the position thereof. Then, for each of the horizontal and vertical directions of the aerial image, the associating unit 13 may multiply a ratio of the distance from a predetermined position (e.g., the upper left corner or the center) in the aerial image to the position of the reference point of the partial road region of interest to the size of the aerial image by the real-space size of the region represented in the aerial image, thereby determining the deviation from the real-space location corresponding to the predetermined position in the aerial image to that of the partial road region. Additionally, the associating unit 13 may determine the real-space location of the partial road region of interest, based on this deviation, the latitude and longitude of the real-space location corresponding to the predetermined position in the aerial image, and the bearing of the horizontal or vertical direction of the aerial image.

The associating unit 13 refers to the locations of the respective road sections indicated by the road map information to identify one of the road sections that is the closest to the real-space location of the partial road region of interest. The associating unit 13 may associate the identified road section with the partial road region of interest as the road section existing at the location of the partial road region of interest. In this way, the associating unit 13 can correctly associate the partial road region of interest with the road section existing at the location of the partial road region. The associating unit 13 may define a plurality of reference points for a single partial road region, and then perform processing similar to the above processing on each of the reference points to associate a plurality of road sections with the partial road region. Alternatively, the associating unit 13 may associate two or more partial road regions with a single road section.

For each of the partial road regions, the associating unit 13 notifies the correcting unit 14 of information indicating the road section associated with the partial road region. The information indicating the road section may be, for example, an identification number (e.g., a link ID) assigned to the road section in the road map information.

The correcting unit 14 corrects each of the partial road regions so as to cover the corresponding road section. At this correction, the correcting unit 14 may correct those pixels of the aerial image which are not included in a road region and are sandwiched between or encircled by one or more partial road regions associated with the same road section (e.g., the pixels corresponding to the breaking place 311a or the holes 311b in FIG. 3) so as to be included in the road region. To this end, for example, the correcting unit 14 may perform, for each of the partial road regions, dilation and erosion of morphological operations more than a predetermined number of times to correct the partial road region in such a way as to close a hole included in the partial road region or to fill a break across the corresponding road section, thereby covering the corresponding road section. However, the correcting unit 14 leaves those pixels unchanged which are not included in any partial road region and are sandwiched between or encircled by two partial road regions associated with different road sections. A region where such pixels, which are not targets for correction, continuously exist adjoins two or more partial road regions associated with different road sections, unlike a region where pixels that are targets for correction continuously exist. For this reason, the associating unit 13 can distinguish between the target pixels and the nontarget pixels.

In the case that a road itself has a hole-like portion like a roundabout, direct application of dilation and erosion of morphological operations to a road region without associating each partial road region with a road section may erroneously close such a portion. However, the correcting unit 14 according to the present embodiment can prevent such erroneous correction of road regions.

Figure 5:
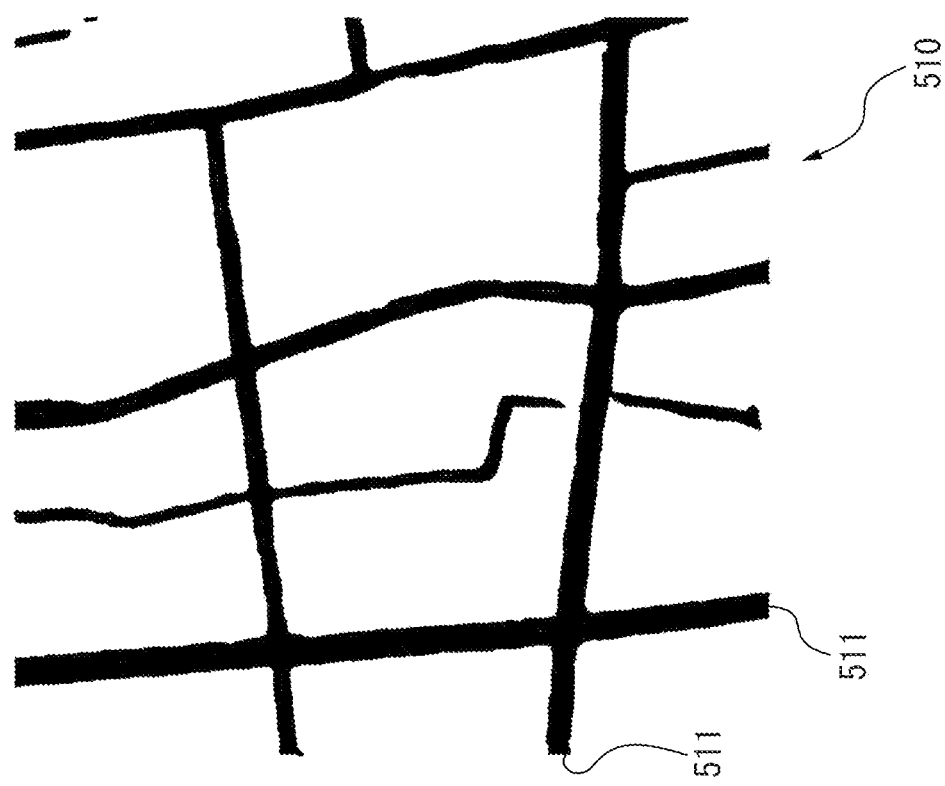
FIG. 5 illustrates an example of uncorrected road regions and corrected road regions.
Figure 5:
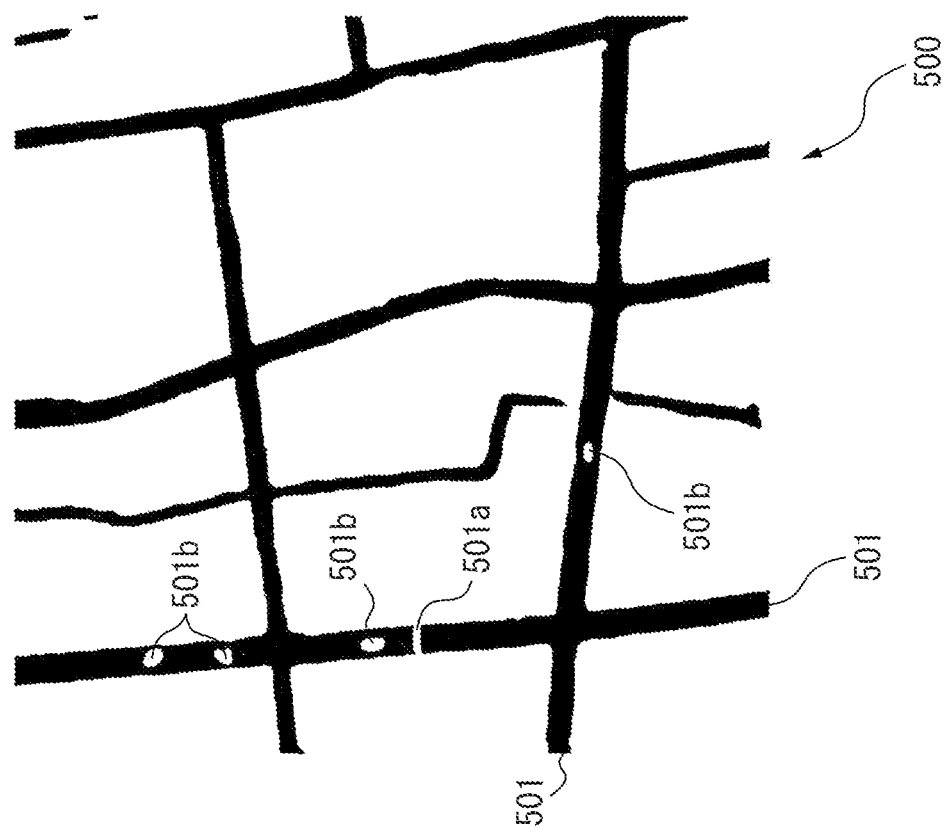

FIG. 5 illustrates an example of uncorrected road regions and corrected road regions. The binary image 500 on the left represents uncorrected road regions 501, whereas the binary image 510 on the right represents corrected road regions 511. The binary images 500 and 510 represent the road regions in black. The uncorrected road regions 501 include a breaking place 501a and holes 501b, whereas the corrected road regions 511 no longer include such a breaking place and holes. This suggests that the corrected road regions 511 represent all the roads more correctly than the uncorrected road regions 501.

The correcting unit 14 writes information indicating the corrected road regions to the storage medium 8 via the storage-medium access device 6. Alternatively, the correcting unit 14 may output the information indicating the corrected road regions to another device via the communication interface 2. Alternatively, the correcting unit 14 may cause the information indicating the corrected road regions to appear on the display 4.

The information indicating the corrected road regions is used, for example, as information indicating that region in the original aerial image which is a target for detection of road markings, such as lane division lines and stop lines. For example, an image obtained from the original aerial image by masking regions other than the corrected road regions is inputted into a classifier that has been trained to detect road markings, thereby detecting the road markings. The detected road markings are then used to generate the high-precision-map information.

FIG. 6 is an operation flowchart of the road-region correcting process. The processor 7 may perform the road-region correcting process in accordance with the following operation flowchart for each aerial image that is a target for the road-region correcting process.

The extracting unit 11 of the processor 7 inputs the aerial image into a classifier to extract road regions in the aerial image (step S101). The segmenting unit 12 of the processor 7 segments each extracted road region into partial road regions (step S102).

For each of the partial road regions, the associating unit 13 of the processor 7 associates the partial road region with a road section that exists at the location of the partial road region and is indicated by the road map information (step S103). The correcting unit 14 of the processor 7 then corrects each of the partial road regions so as to cover the corresponding road section (step S104). After step S104, the processor 7 terminates the road-region correcting process.

As has been described above, the apparatus for correcting a road region segments a road region extracted from an aerial image into partial road regions, and associates, for each of the partial road regions, the partial road region with a road section that exists at the location of the partial road region and is indicated by the road map information. For each of the partial road regions, the apparatus then corrects the road region so as to cover the road section corresponding to the partial road region. In this way, the apparatus can correct road regions extracted from an aerial image so as to correctly cover respective corresponding roads.

According to a modified example, the segmenting unit 12 may segment each road region into partial road regions in accordance with a technique other than thinning or skeletonizing processing. For example, the segmenting unit 12 may apply processing for creating a Voronoi tessellation to each road region to segment the road region into partial road regions. In this case, the segmenting unit 12 selects pixels representing a boundary of a road region from a binary image of the road region as generators, and creates a Voronoi tessellation from the binary image to determine Voronoi edges. The segmenting unit 12 may determine the Voronoi edges in accordance with any algorithm for creating a Voronoi tessellation.

A Voronoi edge is provided at a position equidistant from the two nearest generators. Hence, when pixels representing a boundary of a road region are selected as generators, each Voronoi edge will be determined so as to extend along an individual road and lie in the road. Additionally, Voronoi edges cross at an intersection, and thus a point where Voronoi edges cross, i.e., a Voronoi point appears at each intersection. Thus, the segmenting unit 12 can obtain a set of skeletal lines similar to the skeleton net links in the above embodiment by dividing each Voronoi edge so that a Voronoi point or an endpoint of the Voronoi edge will be one end. The segmenting unit 12 then relates each pixel included in the road region to one of the divided Voronoi edges that is the closest to the pixel, as in the above embodiment. Then, the segmenting unit 12 may determine, for each of the divided Voronoi edges, a region that is a set of pixels related to the Voronoi edge as a partial road region. According to this modified example, since a single Voronoi point is obtained at every intersection, the segmenting unit 12 can prevent defining a plurality of partial road regions at an intersection. For this reason, the segmenting unit 12 can divide a road region into partial road regions more appropriately.

According to another embodiment, the apparatus for correcting a road region may receive information indicating road regions extracted from an aerial image, which is a target for the road-region correcting process, together with the aerial image from another device via the communication interface 2. In this case, the extracting unit 11 may be omitted.

A computer program for causing a computer to execute the functions of the units included in the processor of the apparatus according to the above embodiments or modified example may be provided in a form recorded on a computer-readable recording medium. The computer-readable recording medium may be, for example, a magnetic recording medium, an optical recording medium, or a semiconductor memory.

What is claimed is:

1. An apparatus for correcting a road region, comprising:
a processor configured to: segment a road region extracted from an aerial image and representing a road into a plurality of partial road regions;
associate, for each of the partial road regions, the partial road region with a road section existing at the location of the partial road region, the road section being indicated by map information indicating locations of respective road sections;
correct the road region so as to cover, for each of the partial road regions, the road section corresponding to the partial road region;
select pixels representing a boundary of the road region as generators to create a Voronoi tessellation from the road region to obtain a set of Voronoi edges of the road region;
divide the set of Voronoi edges into individual Voronoi edges so that a Voronoi point or an endpoint included in the set of Voronoi edges will be an endpoint of the individual Voronoi edges;
relate each pixel included in the road region to the closest Voronoi edge of the divided individual Voronoi edges; and
determine, for each of the divided individual Voronoi edges, a set of pixels related to the Voronoi edge as one of the partial road regions, thereby segmenting the road region into the plurality of partial road regions.

2. The apparatus according to claim 1, wherein the processor is further configured to:
thin or skeletonize the road region to obtain a set of skeletal lines of the road region;
divide the set of skeletal lines into individual skeletal lines so that an endpoint or a branching point of skeletal lines included in the set of skeletal lines will be an endpoint of the individual skeletal lines;
relate each pixel included in the road region to the closest skeletal line of the divided individual skeletal lines; and
determine, for each of the divided individual skeletal lines, a set of pixels related to the skeletal line as one of the partial road regions, thereby segmenting the road region into the plurality of partial road regions.

3. The apparatus according to claim 1, wherein the processor is further configured to:
acquire information indicating the location and area of a real-space region represented by the aerial image;
determine, for each of the partial road regions, a real-space location of the partial road region, based on the position of a reference point of the partial road region in the aerial image and the location and area of the real-space region represented by the aerial image; and
determine one of the road sections that is the closest to the real-space location of the partial road region as the road section existing at the location of the partial road region.

4. The apparatus according to claim 1, wherein the processor corrects the road region so that the road region will include pixels of the aerial image which are not included in the road region and are sandwiched between or encircled by one or more partial road regions associated with the same one of the road sections out of the plurality of partial road regions.

5. A method for correcting a road region, comprising:
segmenting a road region extracted from an aerial image and representing a road into a plurality of partial road regions;
associating, for each of the partial road regions, the partial road region with a road section existing at the location of the partial road region, the road section being indicated by map information indicating locations of respective road sections;
correcting the road region so as to cover, for each of the partial road regions, the road section corresponding to the partial road region;
selecting pixels representing a boundary of the road region as generators to create a Voronoi tessellation from the road region to obtain a set of Voronoi edges of the road region;
dividing the set of Voronoi edges into individual Voronoi edges so that a Voronoi point or an endpoint included in the set of Voronoi edges will be an endpoint of the individual Voronoi edges;
relating each pixel included in the road region to the closest Voronoi edge of the divided individual Voronoi edges; and
determining, for each of the divided individual Voronoi edges, a set of pixels related to the Voronoi edge as one of the partial road regions, thereby segmenting the road region into the plurality of partial road regions.

6. A non-transitory recording medium that stores a computer program for correcting a road region for causing a computer to execute:
    segmenting a road region extracted from an aerial image and representing a road into a plurality of partial road regions;
    associating, for each of the partial road regions, the partial road region with a road section existing at the location of the partial road region, the road section being indicated by map information indicating locations of respective road sections;
    correcting the road region so as to cover, for each of the partial road regions, the road section corresponding to the partial road region;
    selecting pixels representing a boundary of the road region as generators to create a Voronoi tessellation from the road region to obtain a set of Voronoi edges of the road region;
    dividing the set of Voronoi edges into individual Voronoi edges so that a Voronoi point or an endpoint included in the set of Voronoi edges will be an endpoint of the individual Voronoi edges;
    relating each pixel included in the road region to the closest Voronoi edge of the divided individual Voronoi edges; and
    determining, for each of the divided individual Voronoi edges, a set of pixels related to the Voronoi edge as one of the partial road regions, thereby segmenting the road region into the plurality of partial road regions.

\* \* \* \* \*